(12) United States Patent
Dong et al.

(10) Patent No.: US 9,800,334 B2
(45) Date of Patent: Oct. 24, 2017

(54) POSITIONING METHOD BASED ON VISIBLE LIGHT SOURCE, MOBILE TERMINAL, AND CONTROLLER

(71) Applicant: Huawei Technologies Co., Ltd., Shenzhen (CN)

(72) Inventors: Xiaowen Dong, Shenzhen (CN); Junfeng Zhao, Shenzhen (CN); Wei Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/070,212

(22) Filed: Mar. 15, 2016

(65) Prior Publication Data
US 2016/0197676 A1    Jul. 7, 2016

Related U.S. Application Data

(63) Continuation of application No. PCT/CN2014/086345, filed on Sep. 12, 2014.

(30) Foreign Application Priority Data

Sep. 18, 2013  (CN) .......................... 2013 1 0430976

(51) Int. Cl.
H04B 10/116    (2013.01)
G01S 11/12    (2006.01)

(52) U.S. Cl.
CPC ............ H04B 10/116 (2013.01); G01S 11/12 (2013.01)

(58) Field of Classification Search
USPC ....................................................... 398/172
See application file for complete search history.

(56) References Cited

U.S. PATENT DOCUMENTS 7,571,791 B2    8/2009  Finn et al.
2007/0254694 A1    11/2007  Nakagwa et al.
(Continued)

FOREIGN PATENT DOCUMENTS

CN    1914834 A    2/2007
CN    1914940 A    2/2007
(Continued)

OTHER PUBLICATIONS

Foreign Communication From a Counterpart Application, European Application No. 14845522.3, Extended European Search Report dated Dec. 12, 2016, 14 pages.
(Continued)

*Primary Examiner* — David Payne
*Assistant Examiner* — Omar S Ismail
(74) *Attorney, Agent, or Firm* — Conley Rose, P.C.

(57) ABSTRACT

A positioning method based on a visible light source, a mobile terminal, and a controller. The method includes acquiring, by a visible light source controller, geographical position attribute information of a position at which a visible light source array is located, determining, by the visible light source controller according to a preset correspondence between geographical position attribute information of a position at which a visible light source array is located and a visible light source array pattern, a visible light source array pattern corresponding to the acquired geographical position attribute information, and controlling, by the visible light source controller according to the determined visible light source array pattern, the luminance state of each visible light source included in the visible light source array. Hence the method reduces the complexity of a positioning process.

18 Claims, 8 Drawing Sheets

(56) References Cited

U.S. PATENT DOCUMENTS

| | | | |
|---|---|---|---|
| 2007/0275750 A1 | 11/2007 | Nakagawa | |
| 2009/0033757 A1 | 2/2009 | Shimada | |
| 2009/0171571 A1 | 7/2009 | Son et al. | |
| 2009/0284366 A1 | 11/2009 | Haartsen et al. | |
| 2009/0310971 A1* | 12/2009 | Kim | H04B 10/1149 398/103 |
| 2011/0010090 A1 | 1/2011 | Bae et al. | |
| 2011/0105134 A1* | 5/2011 | Kim | H04B 10/116 455/450 |
| 2012/0155889 A1* | 6/2012 | Kim | H04B 10/116 398/193 |
| 2012/0281986 A1 | 11/2012 | Leeb et al. | |
| 2013/0141554 A1* | 6/2013 | Ganick | G01S 1/70 348/61 |
| 2013/0163994 A1 | 6/2013 | Iizuka et al. | |

FOREIGN PATENT DOCUMENTS

| | | | |
|---|---|---|---|
| CN | 1950285 | A | 4/2007 |
| CN | 101232327 | A | 7/2008 |
| CN | 101340241 | A | 1/2009 |
| CN | 101358846 | A | 2/2009 |
| CN | 2015071090 | U | 9/2010 |
| CN | 202663404 | U | 1/2013 |
| CN | 103067856 | A | 4/2013 |
| EP | 2498550 | A1 | 9/2012 |
| JP | 2009036571 | A | 2/2009 |
| JP | 2009130725 | A | 6/2009 |
| JP | 2010107235 | A | 5/2010 |
| JP | 2012178764 | A | 9/2012 |

OTHER PUBLICATIONS

Partial English Translation and Abstract of Chinese Patent Application No. CN201571090, Mar. 15, 2016, 2 pages.

Foreign Communication From A Counterpart Application, European Application No. 14845522.3, Partial Supplementary European Search Report dated Aug. 17, 2016, 7 pages.

Foreign Communication From A Counterpart Application, PCT Application No. PCT/CN2014/086345, English Translation of International Search Report dated Dec. 19, 2014, 2 pages.

Foreign Communication From a Counterpart Application, PCT Application No. PCT/CN2014/086345, English Translation of Written Opinion dated Dec. 19, 2014, 6 pages.

Foreign Communication From A Counterpart Application, Chinese Application No. 201310430976.8, Chinese Office Action dated Aug. 26, 2016, 10 pages.

Machine Translation and Abstract of Japanese Publication No. JP2010107235, May 13, 2010, 17 pages.

Machine Translation and Abstract of Japanese Publication No. JP2009130725, Jun. 6, 2009, 23 pages.

Machine Translation and Abstract of Japanese Publication No. JP2012178764, Sep. 13, 2012, 21 pages.

Foreign Communication From A Counterpart Application, Japanese Application No. 2016-543297, Japanese Office Action dated Jun. 20, 2017, 4 pages.

Foreign Communication From A Counterpart Application, Japanese Application No. 2016-543297, English Translation of Japanese Office Action dated Jun. 20, 2017, 6 pages.

* cited by examiner

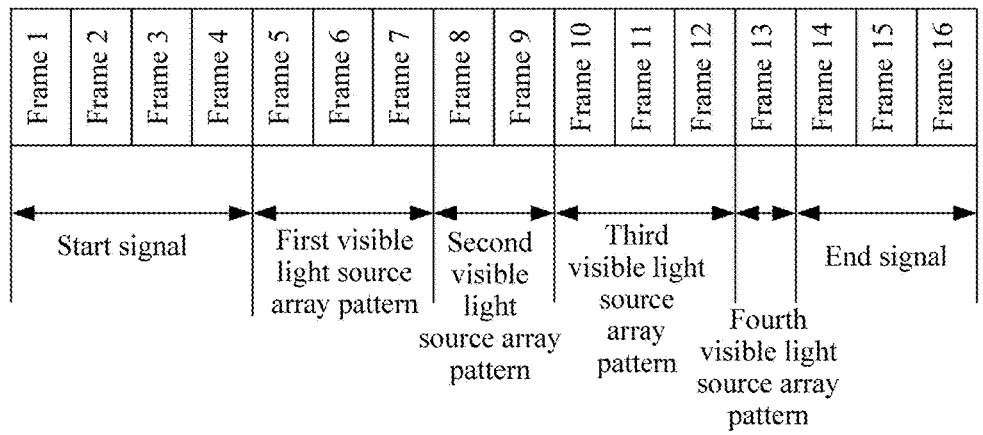

FIG. 2E

```
┌─────────────────────────────────────────────────────────────────┐
│ A visible light source controller receives a visible light source │
│ pattern, where the visible light source array pattern refers to   │ ─ 2000
│ coding information formed by identification information that is   │
│ separately used to identify a luminance state corresponding to    │
│ each visible light source included in a visible light source array│
└─────────────────────────────────────────────────────────────────┘
                                │
                                ▼
┌─────────────────────────────────────────────────────────────────┐
│ The visible light source controller controls, according to the    │
│ received visible light source array pattern, the luminance state  │ ─ 2100
│ of each visible light source included in the visible light source │
│ array                                                             │
└─────────────────────────────────────────────────────────────────┘
```

FIG. 2F

POSITIONING METHOD BASED ON VISIBLE LIGHT SOURCE, MOBILE TERMINAL, AND CONTROLLER

CROSS-REFERENCE TO RELATED APPLICATIONS

This application is a continuation of International Application No. PCT/CN2014/086345, filed on Sep. 12, 2014, which claims priority to Chinese Patent Application No. 201310430976.8, filed on Sep. 18, 2013, both of which are hereby incorporated by reference in their entireties.

TECHNICAL FIELD

The present disclosure relates to the field of communication processing technologies, and in particular, to a positioning method based on a visible light source, a mobile terminal, and a controller.

BACKGROUND

A visible light communication technology is a brand-new wireless communication technology that has sprung up in recent years. A communication function is integrated with illumination of a light source such that the light source can not only implement an illumination function, but can also implement a communication function. Compared with conventional radio frequency communication technologies and any other wireless optical communication technologies, the visible light communication technology has advantages such as high transmit power, no occupation of a radio frequency spectrum, no electromagnetic interference, and no electromagnetic radiation, energy conservation. Therefore, the visible light communication technology has become increasingly important.

Currently, application researches of the visible light communication technology mainly focus on an indoor visible light communication system and an outdoor visible light intelligent transportation system. The visible light communication system can not only provide a light source position signal for indoor positioning, but also has relatively high positioning precision. Therefore, when used indoors, the visible light communication system is generally used for positioning in order to determine a current position of a user. For example, when a user A is in a shopping mall but does not know information about a name of the shopping mall, information about a serial number of a floor on which the user A is, or information about a specific address of the shopping mall, the user A can determine, using the visible light communication system, the information about the name, the information about the floor serial number, the information about the specific address, and the like of the shopping mall in which the user A is.

In the prior art, as shown in FIG. 1, the visible light communication system includes four parts a visible light source, an optical receiver having a short-range wireless communication function, a mobile terminal, and a map server. Steps of a process of implementing positioning are as follows.

Step 10: The visible light source adds a signal that includes at least geographical position coding information of the visible light source into visible light and transmits the visible light to the optical receiver.

Step 11: The optical receiver sends the received signal that includes the geographical position coding information of the visible light source to the mobile terminal.

Step 12: The mobile terminal parses out information about a current geographical position according to the received signal.

However, the prior art has the following defects.

It is required to use an optical receiver as a signal receiving apparatus between a mobile terminal and a visible light source such that the optical receiver sends a received signal that includes geographical position coding information of the visible light source to the mobile terminal. Therefore, a problem that a positioning process is relatively complex exists.

SUMMARY

Embodiments of the present disclosure provide a positioning method based on a visible light source, a mobile terminal, and a controller in order to reduce complexity of a positioning process.

Specific technical solutions provided in the embodiments of the present disclosure are as follows.

According to a first aspect, a positioning method based on a visible light source is provided, where the method is applied in a visible light source positioning system, where the system includes a visible light source array and a visible light source controller, and the visible light source array includes at least one visible light source, and the method includes acquiring, by the visible light source controller, geographical position attribute information of a position at which the visible light source array is located, determining, by the visible light source controller according to a preset correspondence between geographical position attribute information of a position at which a visible light source array is located and a visible light source array pattern, a visible light source array pattern corresponding to the acquired geographical position attribute information, where the visible light source array pattern refers to coding information formed by identification information that is separately used to identify a luminance state corresponding to each visible light source included in the visible light source array, and controlling, by the visible light source controller according to the determined visible light source array pattern, the luminance state of each visible light source included in the visible light source array.

With reference to the first aspect, in a first possible implementation manner, the geographical position attribute information includes physical position information and geographical direction information.

With reference to the first aspect or the first possible implementation manner of the first aspect, in a second possible implementation manner, before the determining, by the visible light source controller according to a preset correspondence between geographical position attribute information of a position at which a visible light source array is located and a visible light source array pattern, a visible light source array pattern corresponding to the acquired geographical position attribute information, the method further includes acquiring, by the visible light source controller through a network, the preset correspondence between geographical position attribute information of a position at which a visible light source array is located and a visible light source array pattern, where the correspondence is stored in a map server.

With reference to the first aspect or the first and the second possible implementation manners of the first aspect, in a third possible implementation manner, the controlling, by the visible light source controller, the luminance state of each visible light source included in the visible light source array further includes controlling, by the visible light source controller, a luminance state of at least two neighboring visible light sources in the visible light source array to be different from each other; or controlling, by the visible light source controller, a luminance state of at least two neighboring visible light sources in the visible light source array to be the same.

With reference to the first aspect or the first to the third possible implementation manners of the first aspect, in a fourth possible implementation manner, the method further includes, when determining that at least one visible light source is added to the visible light source array, updating, by the visible light source controller, the visible light source array pattern of the visible light source array, and sending, to the map server through the network, a correspondence between an updated visible light source array pattern and geographical position attribute information corresponding to the visible light source array pattern such that the map server updates the existing correspondence between a visible light source array pattern and geographical position attribute information.

According to a second aspect, a positioning method based on a visible light source is provided, where the method is applied in a visible light source positioning system, where the system includes a visible light source array and a visible light source controller, and the visible light source array includes multiple visible light sources, and the method includes receiving, by the visible light source controller, a visible light source array pattern, where the visible light source array pattern refers to coding information formed by identification information that is separately used to identify a luminance state corresponding to each visible light source included in the visible light source array, and controlling, by the visible light source controller according to the received visible light source array pattern, the luminance state of each visible light source included in the visible light source array.

According to the third aspect, a positioning method based on a visible light source is provided, including capturing, by a mobile terminal, a luminance state presented by each visible light source included in a visible light source array at a position at which the mobile terminal is currently located, determining, by the mobile terminal according to the captured luminance state presented by each visible light source, a visible light source array pattern corresponding to the visible light source array, where the visible light source array pattern refers to coding information formed by identification information that is separately used to identify the luminance state corresponding to each visible light source included in the visible light source array, obtaining, by the mobile terminal, geographical position attribute information corresponding to the visible light source array pattern in a preset correspondence between geographical position attribute information of a position at which a visible light source array is located and a visible light source array pattern, and using, by the mobile terminal, the geographical position attribute information corresponding to the visible light source array pattern as current geographical position attribute information of the mobile terminal.

With reference to the third aspect, in a first possible implementation manner, the geographical position attribute information includes physical position information and geographical direction information.

With reference to the third aspect or the first possible implementation manner of the third aspect, in a second possible implementation manner, the obtaining, by the mobile terminal, geographical position attribute information corresponding to the visible light source array pattern in a preset correspondence between geographical position attribute information of a position at which a visible light source array is located and a visible light source array pattern further includes obtaining, by the mobile terminal according to a locally stored correspondence between geographical position attribute information of a position at which a visible light source array is located and a visible light source array pattern, geographical position attribute information of a position that is corresponding to the determined visible light source array pattern and at which the visible light source array is located, and using, by the mobile terminal, the obtained geographical position attribute information of the position at which the visible light source array is located as the current geographical position attribute information of the mobile terminal.

With reference to the third aspect or the first possible implementation manner of the third aspect, in a third possible implementation manner, the obtaining, by the mobile terminal, geographical position attribute information corresponding to the visible light source array pattern in a preset correspondence between geographical position attribute information of a position at which a visible light source array is located and a visible light source array pattern further includes sending, by the mobile terminal, the determined visible light source array pattern to a map server, and receiving geographical position attribute information of a position that is corresponding to the determined visible light source array pattern and at which the visible light source array is located, where the geographical position attribute information is determined and fed back by the map server according to the stored correspondence, and using, by the mobile terminal, the received geographical position attribute information of the position at which the visible light source array is located as the current geographical position attribute information of the mobile terminal.

With reference to the second or the third possible implementation manner of the third aspect, in a fourth possible implementation manner, the using, by the mobile terminal, the geographical position attribute information of the position at which the visible light source array is located as the current geographical position attribute information of the mobile terminal further includes using, by the mobile terminal, physical position information of the position at which the visible light source array is located as current physical position information of the mobile terminal, and determining, by the mobile terminal, current geographical movement direction information of the mobile terminal according to an included angle between a direction pointing line corresponding to geographical direction information of the position at which the visible light source array is located and an axis specified when the mobile terminal captures the luminance state presented by each visible light source included in the visible light source array.

According to a fourth aspect, a visible light source controller is provided, including a first acquiring unit configured to acquire geographical position attribute information of a position at which a visible light source array is located; a determining unit configured to determine, according to a preset correspondence between geographical position attribute information of a position at which a visible light source array is located and a visible light source array pattern, a visible light source array pattern corresponding to the acquired geographical position attribute information, where the visible light source array pattern refers to coding information formed by identification information that is separately used to identify a luminance state corresponding to each visible light source included in the visible light source array, and a control unit configured to control, according to the determined visible light source array pattern, the luminance state of each visible light source included in the visible light source array.

With reference to the fourth aspect, in a first possible implementation manner, the geographical position attribute information acquired by the first acquiring unit includes physical position information and geographical direction information.

With reference to the fourth aspect or the first possible implementation manner of the fourth aspect, in a second possible implementation manner, the visible light source controller further includes a second acquiring unit, where the second acquiring unit is configured to acquire, through a network, the preset correspondence between geographical position attribute information of a position at which a visible light source array is located and a visible light source array pattern, where the correspondence is stored in a map server.

With reference to the fourth aspect or the first and the second possible implementation manners of the fourth aspect, in a third possible implementation manner, the control unit is further configured to control a luminance state of at least two neighboring visible light sources in the visible light source array to be different from each other, or control a luminance state of at least two neighboring visible light sources in the visible light source array to be the same.

With reference to the fourth aspect or the first to the third possible implementation manners of the fourth aspect, in a fourth possible implementation manner, the visible light source controller further includes a sending unit, where the sending unit is configured to, when it is determined that at least one visible light source is added to the visible light source array, update the visible light source array pattern of the visible light source array, and send, to the map server through the network, a correspondence between an updated visible light source array pattern and geographical position attribute information corresponding to the visible light source array pattern such that the map server updates the existing correspondence between a visible light source array pattern and geographical position attribute information.

According to a fifth aspect, a visible light source controller is provided, including a receiving unit configured to receive a visible light source array pattern, where the visible light source array pattern refers to coding information formed by identification information that is separately used to identify a luminance state corresponding to each visible light source included in the visible light source array, and a control unit configured to control, according to the received visible light source array pattern, the luminance state of each visible light source included in the visible light source array.

According to a sixth aspect, a mobile terminal is provided, including a capturing unit configured to capture a luminance state presented by each visible light source included in a visible light source array at a position at which the mobile terminal is currently located, a third determining unit configured to determine, according to the captured luminance state presented by each visible light source, a visible light source array pattern corresponding to the visible light source array, where the visible light source array pattern refers to coding information formed by identification information that is separately used to identify the luminance state corresponding to each visible light source included in the visible light source array, an obtaining unit configured to obtain geographical position attribute information corresponding to the visible light source array pattern in a preset correspondence between geographical position attribute information of a position at which a visible light source array is located and a visible light source array pattern, and a fourth determining unit configured to use the geographical position attribute information corresponding to the visible light source array pattern as current geographical position attribute information of the mobile terminal.

With reference to the sixth aspect, in a first possible implementation manner, the geographical position attribute information obtained by the obtaining unit includes physical position information and geographical direction information.

With reference to the sixth aspect or the first possible implementation manner of the sixth aspect, in a second possible implementation manner, the fourth determining unit is further configured to obtain, according to a locally stored correspondence between geographical position attribute information of a position at which a visible light source array is located and a visible light source array pattern, geographical position attribute information of a position that is corresponding to the determined visible light source array pattern and at which the visible light source array is located, and use the obtained geographical position attribute information of the position at which the visible light source array is located as the current geographical position attribute information of the mobile terminal.

With reference to the sixth aspect or the first and the second possible implementation manners of the sixth aspect, in a third possible implementation manner, the fourth determining unit is further configured to send the visible light source array pattern determined by the third determining unit to a map server, and receive geographical position attribute information of a position that is corresponding to the determined visible light source array pattern and at which the visible light source array is located, where the geographical position attribute information is determined and fed back by the map server according to the stored correspondence, and use the received geographical position attribute information of the position at which the visible light source array is located as the current geographical position attribute information of the mobile terminal.

With reference to the sixth aspect or the first to the third possible implementation manners of the sixth aspect, in a fourth possible implementation manner, the fourth determining unit is further configured to use physical position information of the position at which the visible light source array is located as current physical position information of the mobile terminal; and determine current geographical movement direction information of the mobile terminal according to an included angle between a direction pointing line corresponding to geographical direction information of the position at which the visible light source array is located and an axis specified when the mobile terminal captures the luminance state presented by each visible light source included in the visible light source array.

In the positioning method provided in the embodiments of the present disclosure, a mobile terminal can directly acquire a luminance state presented by each visible light source included in a visible light source array, and therefore can further determine, according to the acquired luminance state presented by each visible light source, a visible light source array pattern corresponding to the visible light source array, where the visible light source array pattern refers to coding information formed by identification information that is separately used to identify the luminance state corresponding to each visible light source included in the visible light source array in order to determine current geographical position attribute information of the mobile terminal. The current geographical position attribute information of the mobile terminal is determined without using a signal forwarded by an optical receiver. Therefore, complexity of a positioning process is reduced.

BRIEF DESCRIPTION OF DRAWINGS

FIG. 2E is a schematic diagram of controlling a luminance state of a visible light source array according to an embodiment of the present disclosure;

FIG. 2F is a second detailed flowchart of positioning based on a visible light source according to an embodiment of the present disclosure;

DESCRIPTION OF EMBODIMENTS

Figure 1:
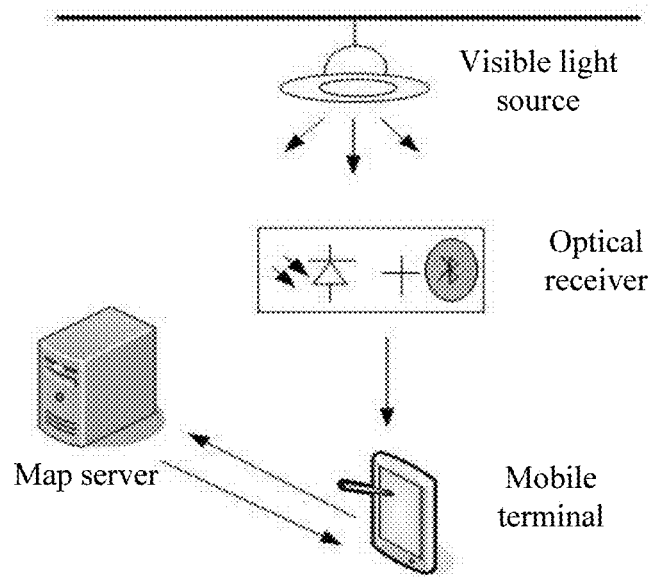
FIG. 1 is a schematic diagram of a visible light communication system in the prior art.

To make the objectives, technical solutions, and advantages of the embodiments of the present disclosure clearer, the following clearly and describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

To resolve problems in the prior art that during positioning using a visible light source, a positioning process is relatively complex and a positioning method is relatively onefold, the embodiments of the present disclosure provide three positioning methods, where the methods are applied in a visible light source positioning system, where the system includes a visible light source array and a visible light source controller, and the visible light source array includes at least one visible light source.

A method is as follows. The visible light source controller acquires geographical position attribute information of a position at which the visible light source array is located. The visible light source controller determines, according to a preset correspondence between geographical position attribute information of a position at which a visible light source array is located and a visible light source array pattern, a visible light source array pattern corresponding to the acquired geographical position attribute information, where the visible light source array pattern refers to coding information formed by identification information that is separately used to identify a luminance state corresponding to each visible light source included in the visible light source array, and the visible light source controller controls, according to the determined visible light source array pattern, the luminance state of each visible light source included in the visible light source array. In this way, when acquiring a luminance state of each visible light source included in a visible light source array, a mobile terminal can directly acquire the luminance state of each visible light source included in the visible light source array in order to determine current geographical position attribute information of the mobile terminal. The current geographical position attribute information of the mobile terminal is determined without using a signal forwarded by an optical receiver. Therefore, complexity of a positioning process is reduced.

Another method is as follows. The visible light source controller receives a visible light source array pattern, where the visible light source array pattern refers to coding information formed by identification information that is separately used to identify a luminance state corresponding to each visible light source included in the visible light source array, and the visible light source controller controls, according to the received visible light source array pattern, the luminance state of each visible light source included in the visible light source array. In this way, when acquiring a luminance state of each visible light source included in a visible light source array, a mobile terminal can directly acquire the luminance state of each visible light source included in the visible light source array in order to determine current geographical position attribute information of the mobile terminal. The current geographical position attribute information of the mobile terminal is determined without using a signal forwarded by an optical receiver. Therefore, complexity of a positioning process is reduced.

Still another method is as follows. A mobile terminal captures a luminance state presented by each visible light source included in a visible light source array at a position at which the mobile terminal is currently located. The mobile terminal determines, according to the captured luminance state presented by each visible light source, a visible light source array pattern corresponding to the visible light source array, where the visible light source array pattern refers to coding information formed by identification information that is separately used to identify the luminance state corresponding to each visible light source included in the visible light source array. The mobile terminal obtains geographical position attribute information corresponding to the visible light source array pattern in a preset correspondence between geographical position attribute information of a position at which a visible light source array is located and a visible light source array pattern, and the mobile terminal uses the geographical position attribute information corresponding to the visible light source array pattern as current geographical position attribute information of the mobile terminal. In this way, the mobile terminal can directly acquire the luminance state of each visible light source included in the visible light source array in order to determine the current geographical position attribute information of the mobile terminal. The current geographical position attribute information of the mobile terminal is determined without using a signal forwarded by an optical receiver. Therefore, complexity of a positioning process is reduced.

Figure 2A:
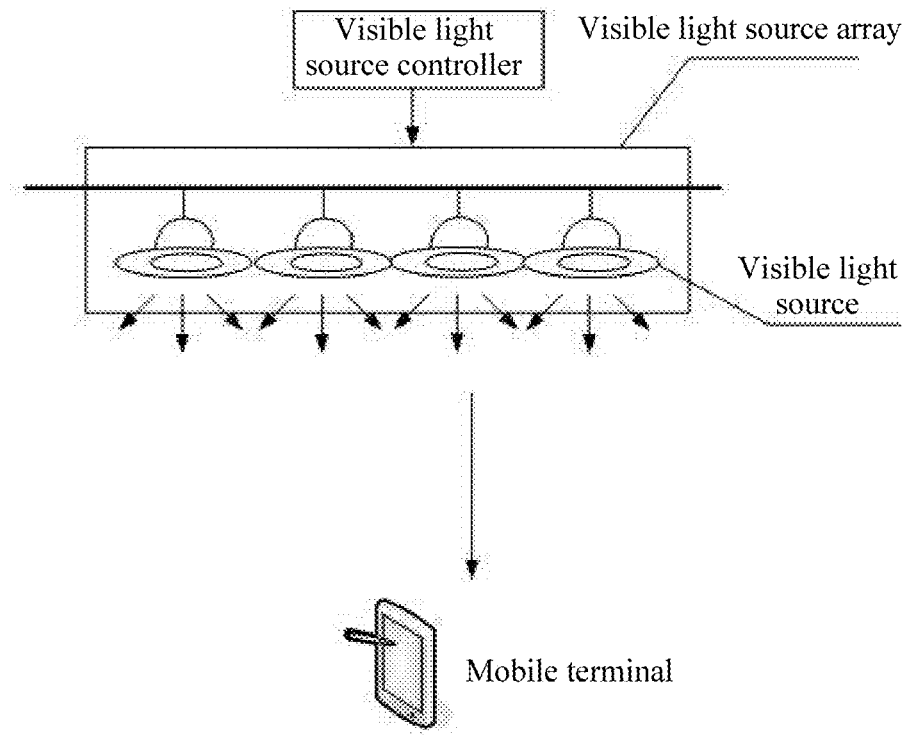
FIG. 2A is a schematic diagram of a visible light communication system according to an embodiment of the present disclosure.

The following describes optional implementation manners of the present disclosure in detail with reference to the accompanying drawings. The methods are applied in a visible light source positioning system, which is further shown in FIG. 2A. The system includes a visible light source array and a visible light source controller, where the visible light source array includes at least one visible light source.

Figures 2B, 2C, 2D:
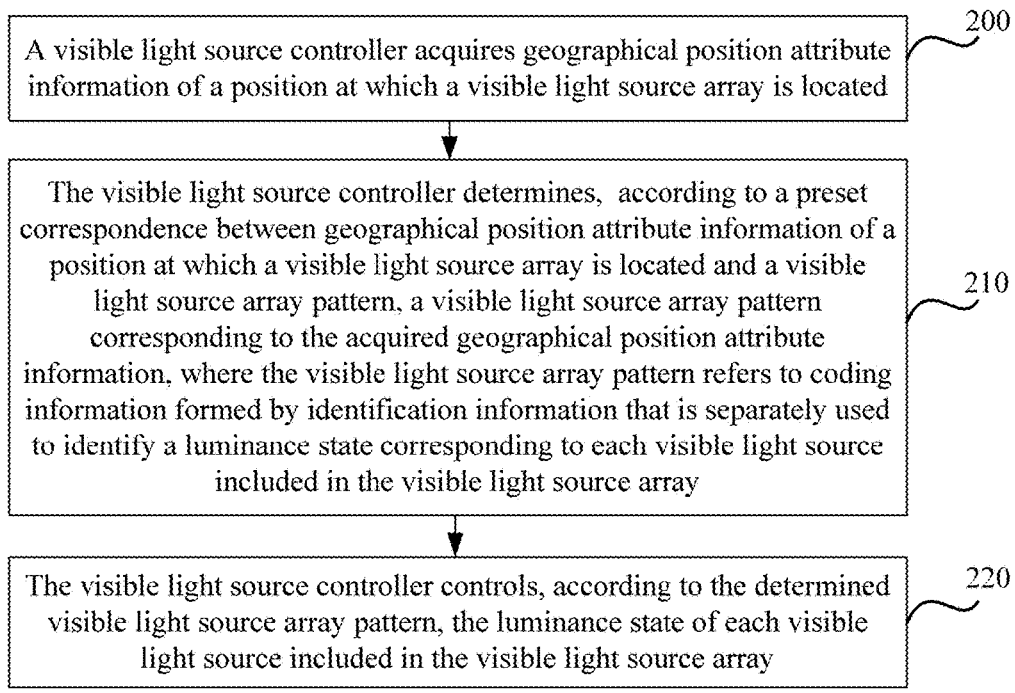
FIG. 2B is a first detailed flowchart of positioning based on a visible light source according to an embodiment of the present disclosure.
FIG. 2C is a schematic diagram of a visible light source array pattern according to an embodiment of the present disclosure.
FIG. 2D is a schematic diagram of a correspondence between a controller and a visible light source according to an embodiment of the present disclosure.

Referring to FIG. 2B, in this embodiment of the present disclosure, a first detailed process of positioning based on a visible light source is as follows.

Step 200: The visible light source controller acquires geographical position attribute information of a position at which the visible light source array is located.

Step 210: The visible light source controller determines, according to a preset correspondence between geographical position attribute information of a position at which a visible light source array is located and a visible light source array pattern, a visible light source array pattern corresponding to the acquired geographical position attribute information, where the visible light source array pattern refers to coding information formed by identification information that is separately used to identify a luminance state corresponding to each visible light source included in the visible light source array.

Step 220: The visible light source controller controls, according to the determined visible light source array pattern, the luminance state of each visible light source included in the visible light source array.

In this embodiment of the present disclosure, the visible light source has many types, for example, may be a light-emitting diode (LED) lamp, or may be an incandescent lamp, or may be a fluorescent lamp. In an actual application, the visible light source may be any component that emits a visible light, which is not described in detail herein again.

In an actual application, a mobile terminal not only needs to acquire physical position information of a visible light source array at a position at which the mobile terminal is currently located, but may also need to acquire an indication of a geographical movement direction of the mobile terminal, for example, an indication indicating which direction of north, south, east and west the movement direction is. Therefore, the geographical position attribute information includes physical position information and geographical direction information, where the physical position information includes at least information about a name of a building in which the visible light source array is, information about a serial number of a floor on which the visible light source array is, and information about a serial number of the visible light source array.

In this embodiment of the present disclosure, the visible light source array pattern refers to coding information formed by identification information that is separately used to identify the luminance state corresponding to each visible light source included in the visible light source array. For example, a visible light source array A includes 45 visible light sources, a light source switched-on state of any visible light source is identified using "1", and a light source switched-off state of any visible light source is identified using "0". Then, a pattern of the visible light source array A may be indicated using coding information shown in FIG. 2C.

In this embodiment of the present disclosure, after the visible light source array pattern corresponding to the acquired geographical position attribute information is determined, the luminance state of each visible light source included in the visible light source array is controlled according to the determined visible light source array pattern.

FIG. 2C is used as an example for description. After the visible light source array pattern is determined, if identification information in the pattern is "1", a visible light source located at a physical position corresponding to the identification information is controlled to emit light, or if identification information in the pattern is "0", a visible light source located at a position corresponding to the identification information is controlled to stop emitting light.

In this embodiment of the present disclosure, before determining the visible light source array pattern corresponding to the acquired geographical position attribute information according to the preset correspondence between geographical position attribute information of a position at which a visible light source array is located and a visible light source array pattern, the visible light source controller may further perform the following operation acquiring, by the visible light source controller through a network, the preset correspondence between geographical position attribute information of a position at which a visible light source array is located and a visible light source array pattern, where the correspondence is stored in a map server.

In this embodiment of the present disclosure, there are many manners of controlling the luminance state of each visible light source included in the visible light source array. Optionally, the visible light source controller controls a luminance state of at least two neighboring visible light sources in the visible light source array to be different from each other, or the visible light source controller controls a luminance state of at least two neighboring visible light sources in the visible light source array to be the same.

In an actual application, due to a problem of resolution, a mobile terminal cannot well recognize a luminance state presented by each visible light source, and consequently, cannot accurately determine a visible light source array pattern corresponding to a visible light source array, resulting in a positioning error or a positioning failure. In view of such a possible case, luminance states of neighboring visible light sources may be made the same at a same moment such that the mobile terminal can well recognize the luminance state presented by each visible light source, and the visible light source array pattern corresponding to the visible light source array can be determined more accurately. For example, as shown in FIG. 2D, a visible light source array includes 40 visible light sources, and four neighboring visible light sources are in a same luminance state at a same moment.

In this embodiment of the present disclosure, the geographical position attribute information includes physical position information and geographical direction information.

When the physical position information includes at least the information about the name of the building in which the visible light source array is, the information about the serial number of the floor on which the visible light source array is, and the information about the serial number of the visible light source array, the visible light source array pattern is divided into a first visible light source array pattern used to indicate the information about the name of the building in which the visible light source array is, a second visible light source array pattern used to indicate the information about the serial number of the floor on which the visible light source array is, a third visible light source array pattern used to indicate the information about the serial number of the visible light source array, and a fourth visible light source array pattern used to indicate geographical direction information of the visible light source array. In this case, as shown in FIG. 2E, when the luminance state of each visible light source included in the visible light source array is controlled according to the determined visible light source array pattern, the luminance state of each visible light source included in the visible light source array may be controlled separately according to the first visible light source array pattern, the second visible light source array pattern, the third visible light source array pattern, and the fourth visible light source array pattern.

In this embodiment of the present disclosure, after the visible light source array pattern is determined and before the luminance state of each visible light source included in the visible light source array is controlled according to the determined visible light source array pattern, a start signal is transmitted. After the start signal is transmitted, the luminance state of each visible light source included in the visible light source array is controlled according to the determined visible light source array pattern, and then an end signal may be transmitted.

The start signal may be a fixed visible light source array pattern, or may further be that a same visible light source array pattern is received within consecutive frames.

Likewise, the end signal may also be a fixed visible light source array pattern, or may further be that a same visible light source array pattern is received within consecutive frames. The fixed visible light source array pattern as the start signal may be the same as or may be different from the fixed visible light source array pattern as the end signal.

In this embodiment of the present disclosure, fixed visible light source array patterns are used as the start signal and the end signal, which increases overheads of an invalid pattern frame. Therefore, when the visible light source array pattern is divided into the first visible light source array pattern, the second visible light source array pattern, the third visible light source array pattern, and the fourth visible light source array pattern, the fourth visible light source array pattern may be used as the start signal, and the fourth visible light source array pattern may also indicate the end signal, or the end signal may be omitted in order to reduce duration of a process in which the luminance state of each visible light source included in the visible light source array is controlled according to the determined visible light source array pattern, and improve efficiency.

In this embodiment of the present disclosure, in an actual application, a visible light source may be added to the visible light source array at any time. In this case, when determining that at least one visible light source is added to the visible light source array, the visible light source controller updates the visible light source array pattern of the visible light source array, and sends, to the map server through the network, a correspondence between an updated visible light source array pattern and geographical position attribute information corresponding to the visible light source array pattern such that the map server updates the existing correspondence between a visible light source array pattern and geographical position attribute information.

This embodiment of the present disclosure describes how the map server ensures that the correspondence, stored in the map server, between geographical position attribute information of a position at which a visible light source array is located and a visible light source array pattern is a one-to-one correspondence, that is, how to ensure that one visible light source array pattern corresponds to only one piece of geographical position attribute information. Because in the map server, a visible light source array pattern is determined according to coding information of Chinese name information of geographical position attribute information corresponding to the visible light source array pattern, where the Chinese name information of the geographical position attribute information not only includes information about a floor on which a visible light source is, but also includes information about a building name, a probability that any two groups of visible light sources have same Chinese name information of geographical position attribute information is relatively low, that is, a probability that coding information of Chinese name information of geographical position attribute information of positions at which any two groups of visible light sources are located is the same is relatively low, and therefore, the correspondence, stored in the map server, between geographical position attribute information of a position at which a visible light source array is located and a visible light source array pattern is a one-to-one correspondence.

Referring to FIG. 2F, in an embodiment of the present disclosure, a second detailed process of positioning based on a visible light source is as follows.

Step 2000: A visible light source controller receives a visible light source array pattern, where the visible light source array pattern refers to coding information formed by identification information that is separately used to identify a luminance state corresponding to each visible light source included in a visible light source array.

Step 2100: The visible light source controller controls, according to the received visible light source array pattern, the luminance state of each visible light source included in the visible light source array.

Figure 3A:
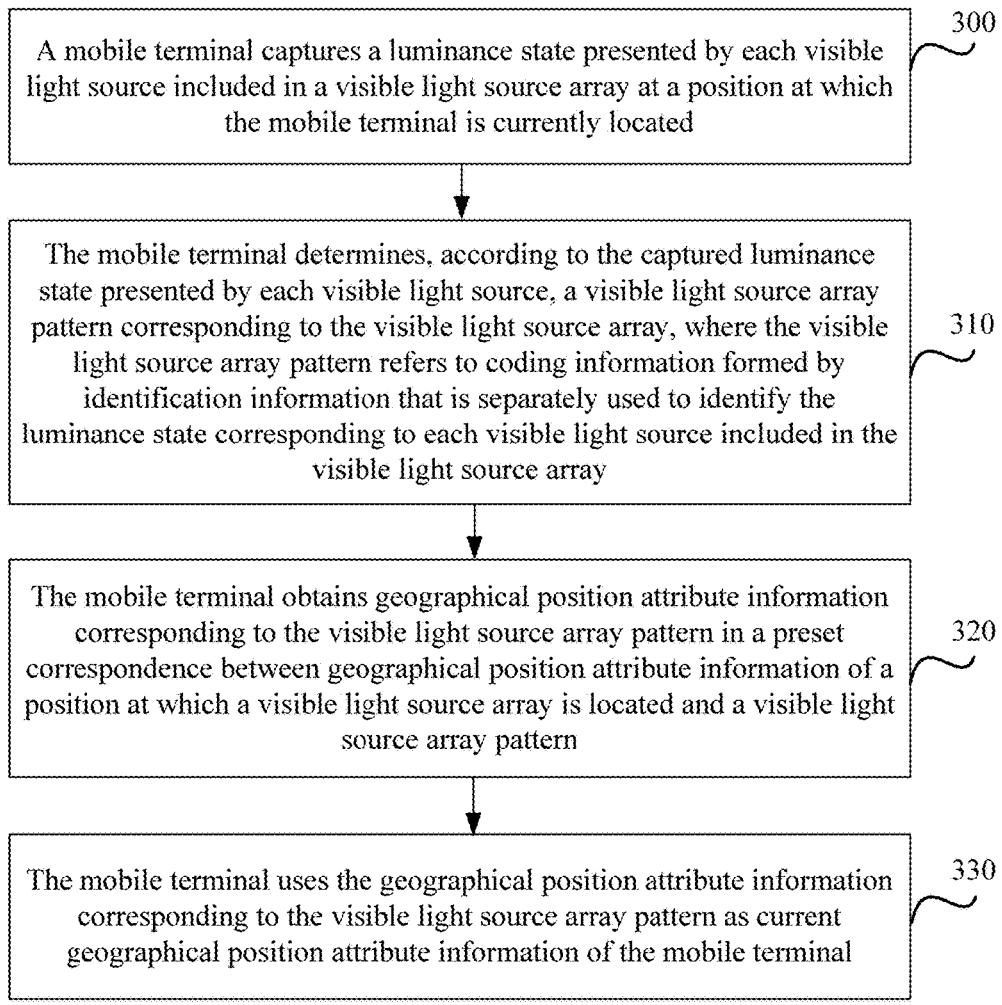
FIG. 3A is a third detailed flowchart of positioning based on a visible light source according to an embodiment of the present disclosure.

Referring to FIG. 3A, in an embodiment of the present disclosure, a third detailed process of positioning based on a visible light source is as follows.

Step 300: A mobile terminal captures a luminance state presented by each visible light source included in a visible light source array at a position at which the mobile terminal is currently located.

Step 310: The mobile terminal determines, according to the captured luminance state presented by each visible light source, a visible light source array pattern corresponding to the visible light source array, where the visible light source array pattern refers to coding information formed by identification information that is separately used to identify the luminance state corresponding to each visible light source included in the visible light source array.

Step 320: The mobile terminal obtains geographical position attribute information corresponding to the visible light source array pattern in a preset correspondence between geographical position attribute information of a position at which a visible light source array is located and a visible light source array pattern.

Step 330: The mobile terminal uses the geographical position attribute information corresponding to the visible light source array pattern as current geographical position attribute information of the mobile terminal.

In this embodiment of the present disclosure, the geographical position attribute information is in multiple forms, for example, including physical position information and geographical direction information.

In this embodiment of the present disclosure, there are many manners in which the mobile terminal obtains the geographical position attribute information corresponding to the visible light source array pattern in the preset correspondence between geographical position attribute information of a position at which a visible light source array is located and a visible light source array pattern.

Optionally, the mobile terminal obtains, according to a locally stored correspondence between geographical position attribute information of a position at which a visible light source array is located and a visible light source array pattern, geographical position attribute information of a position that is corresponding to the determined visible light source array pattern and at which the visible light source array is located, and the mobile terminal uses the determined geographical position attribute information of the position at which the visible light source array is located as current geographical position attribute information of the mobile terminal.

It may also be that the mobile terminal sends the determined visible light source array pattern to a map server, and receives geographical position attribute information of a position that is corresponding to the determined visible light source array pattern and at which the visible light source array is located, where the geographical position attribute information is determined and fed back by the map server according to the stored correspondence, and the mobile terminal uses the received geographical position attribute information of the position at which the visible light source array is located as current geographical position attribute information of the mobile terminal.

In this embodiment of the present disclosure, there are many manners of using the geographical position attribute information of the position at which the visible light source array is located as current geographical position attribute information of the mobile terminal. Optionally, the mobile terminal uses physical position information of the position at which the visible light source array is located as the current physical position attribute information of the mobile terminal, and the mobile terminal determines current geographical movement direction information of the mobile terminal according to an included angle between a direction pointing line corresponding to geographical direction information of the position at which the visible light source array is located and an axis specified when the mobile terminal captures the luminance state presented by each visible light source included in the visible light source array.

Figure 3B:
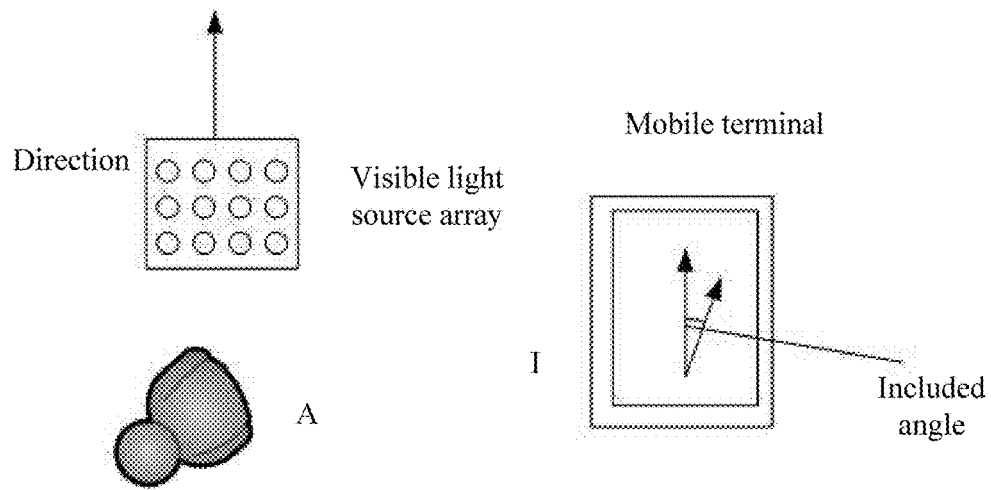
FIG. 3B is a first schematic diagram of an included angle between a visible light source array and a mobile terminal according to an embodiment of the present disclosure.
Figure 3C:
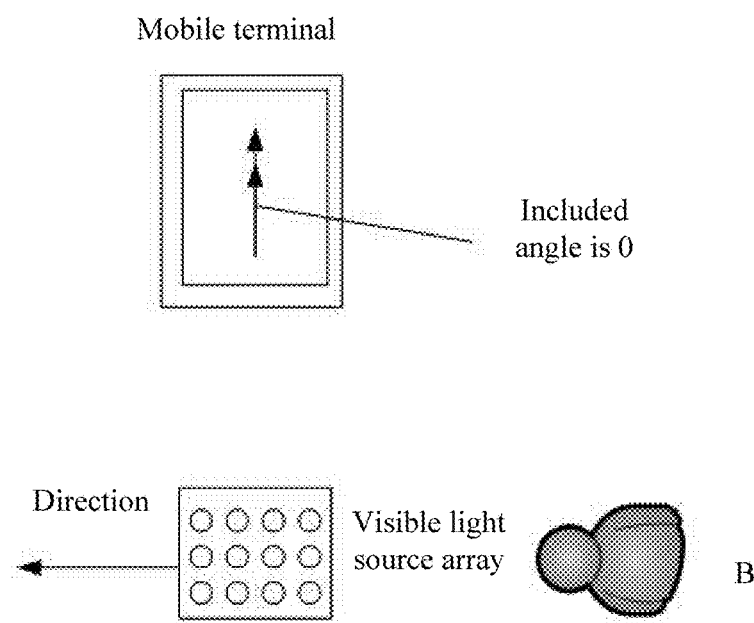
FIG. 3C is a second schematic diagram of an included angle between a visible light source array and a mobile terminal according to an embodiment of the present disclosure.

The included angle between a direction pointing line corresponding to geographical direction information of the position at which the visible light source array is located and an axis specified when the mobile terminal captures the luminance state presented by each visible light source included in the visible light source array is shown in FIG. 3B and FIG. 3C.

Figure 4A:
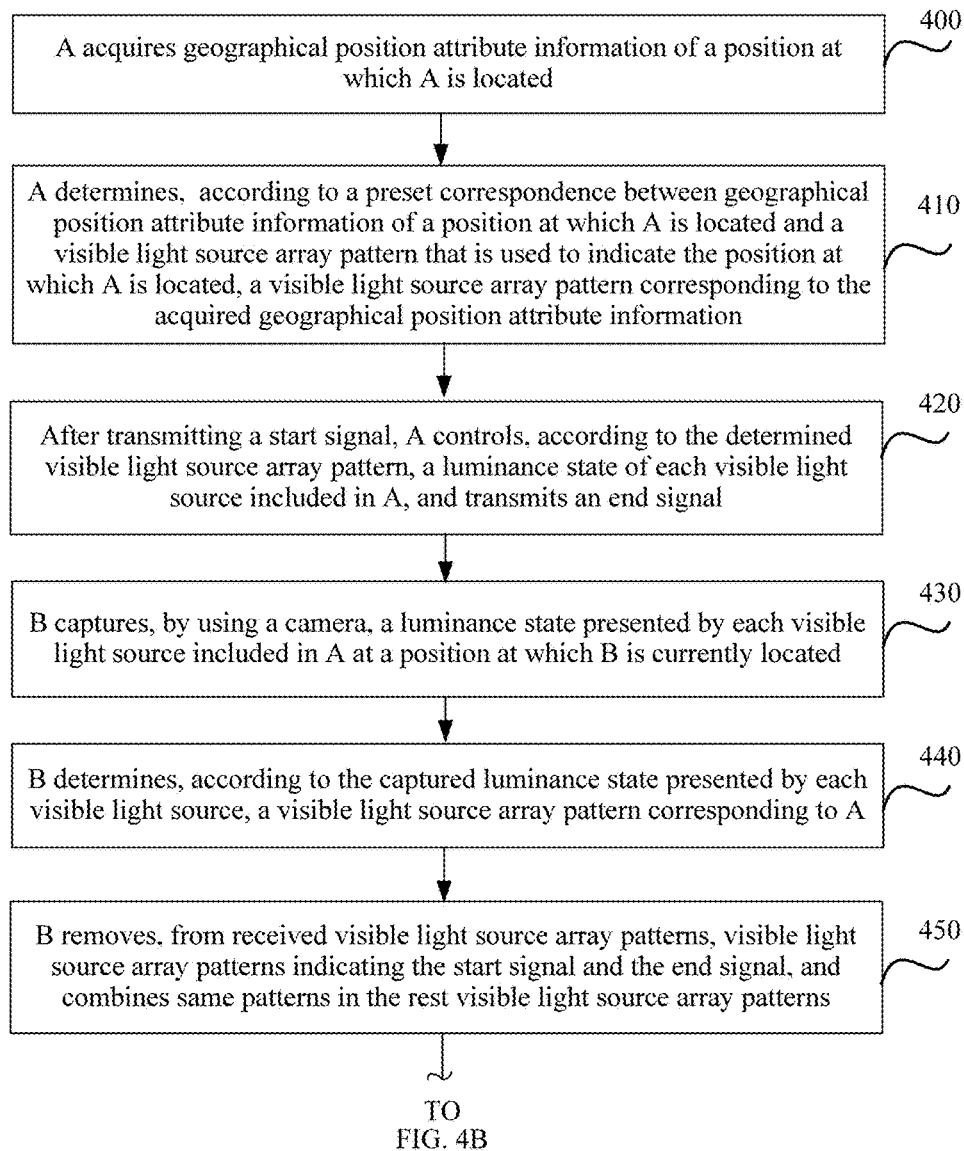
FIG. 4A and FIG. 4B are a flowchart of a process of positioning based on of a visible light source according to an embodiment of the present disclosure.
Figure 4B:
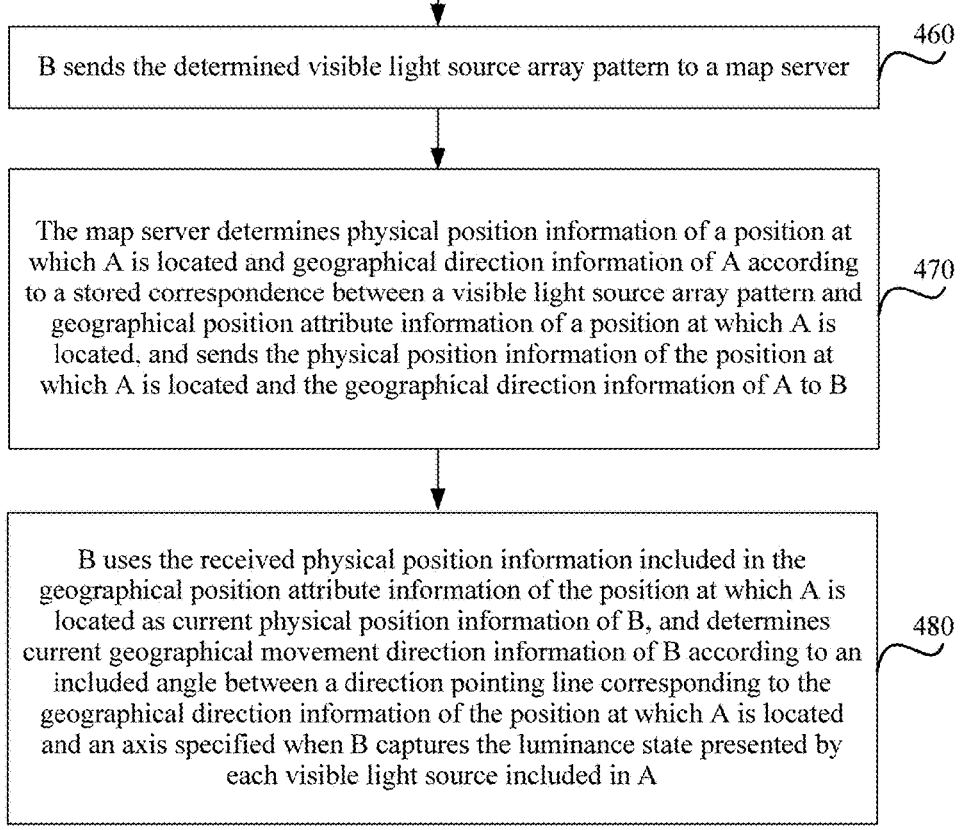

For a better understanding of this embodiment of the present disclosure, the following provides a specific application scenario. Detailed description is further provided for a process of positioning based on a visible light source, which is further shown in FIG. 4A and FIG. 4B (a visible light source array is A, and a mobile terminal is B):

Step 400: A acquires geographical position attribute information of a position at which A is located.

In this step, A includes multiple visible light sources.

Step 410: A determines, according to a preset correspondence between geographical position attribute information of a position at which A is located and a visible light source array pattern that is used to indicate the position at which A is located, a visible light source array pattern corresponding to the acquired geographical position attribute information.

In this step, the visible light source array pattern refers to coding information formed by identification information that is separately used to identify a luminance state corresponding to each visible light source included in A.

Step 420: After transmitting a start signal, A controls, according to the determined visible light source array pattern, a luminance state of each visible light source included in A, and transmits an end signal.

In this step, the start signal is that visible light source array patterns within six consecutive frames are same, and the end signal is the same as the start signal.

Step 430: B captures, using a camera, a luminance state presented by each visible light source included in A at a position at which B is currently located.

Step 440: B determines, according to the captured luminance state presented by each visible light source, a visible light source array pattern corresponding to A.

The visible light source array pattern refers to coding information formed by identification information that is separately used to identify the luminance state corresponding to each visible light source included in A.

Step 450: B removes, from received visible light source array patterns, visible light source array patterns indicating the start signal and the end signal, and combines same patterns in the rest visible light source array patterns.

In this step, combining patterns refers to reserving any one of the same patterns and deleting the rest patterns.

Step 460: B sends the determined visible light source array pattern to a map server.

Step 470: The map server determines physical position information of a position at which A is located and geographical direction information of A according to a stored correspondence between a visible light source array pattern and geographical position attribute information of a position at which A is located, and sends the physical position information of the position at which A is located and the geographical direction information of A to B.

In this step, the geographical direction information of A includes at least identification information for a direction of A, for example, north, south, east, and west.

Step 480: B uses the received physical position information included in the geographical position attribute information of the position at which A is located as current physical position information of B, and determines current geographical movement direction information of B according to an included angle between a direction pointing line corresponding to the geographical direction information of the position at which A is located and an axis specified when B captures the luminance state presented by each visible light source included in A.

Figure 5:
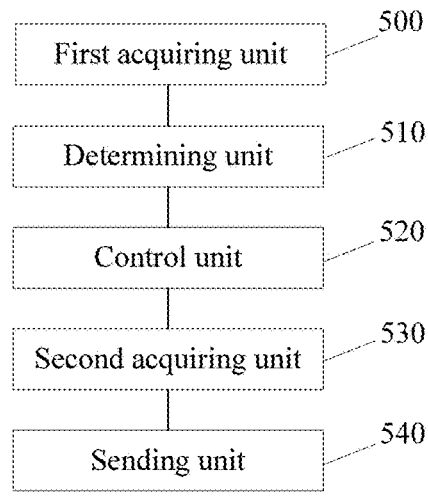
FIG. 5 is a first schematic diagram of a functional structure of a visible light source controller according to an embodiment of the present disclosure.

Referring to FIG. 5, an embodiment of the present disclosure further provides a visible light source controller, where the visible light source controller includes a first acquiring unit 500 configured to acquire geographical position attribute information of a position at which a visible light source array is located, a determining unit 510 configured to determine, according to a preset correspondence between geographical position attribute information of a position at which a visible light source array is located and a visible light source array pattern, a visible light source array pattern corresponding to the acquired geographical position attribute information, where the visible light source array pattern refers to coding information formed by identification information that is separately used to identify a luminance state corresponding to each visible light source included in the visible light source array, and a control unit 520 configured to control, according to the determined visible light source array pattern, the luminance state of each visible light source included in the visible light source array.

In this embodiment of the present disclosure, optionally, the geographical position attribute information acquired by the first acquiring unit 500 includes physical position information and geographical direction information.

In this embodiment of the present disclosure, the visible light source controller further includes a second acquiring unit 530, where the second acquiring unit 530 is configured to acquire, through a network, the preset correspondence between geographical position attribute information of a position at which a visible light source array is located and a visible light source array pattern, where the correspondence is stored in a map server.

In this embodiment of the present disclosure, the control unit 520 is further configured to control a luminance state of at least two neighboring visible light sources in the visible light source array to be different from each other, or control a luminance state of at least two neighboring visible light sources in the visible light source array to be the same.

In this embodiment of the present disclosure, the visible light source controller further includes a sending unit 540, where the sending unit 540 is configured to, when it is determined that at least one visible light source is added to the visible light source array, update the visible light source array pattern of the visible light source array, and send, to the map server through the network, a correspondence between an updated visible light source array pattern and geographical position attribute information corresponding to the visible light source array pattern such that the map server updates the existing correspondence between a visible light source array pattern and geographical position attribute information.

Figure 6:
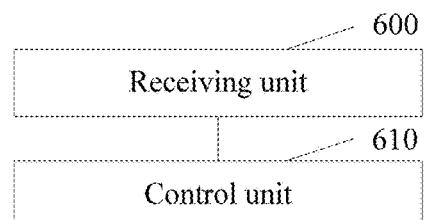
FIG. 6 is a second schematic diagram of a functional structure of a visible light source controller according to an embodiment of the present disclosure.

Referring to FIG. 6, an embodiment of the present disclosure further provides a visible light source controller, where the visible light source controller includes a receiving unit 600 configured to receive a visible light source array pattern, where the visible light source array pattern refers to coding information formed by identification information that is separately used to identify a luminance state corresponding to each visible light source included in the visible light source array, and a control unit 610 configured to control, according to the received visible light source array pattern, the luminance state of each visible light source included in the visible light source array.

Figure 7:
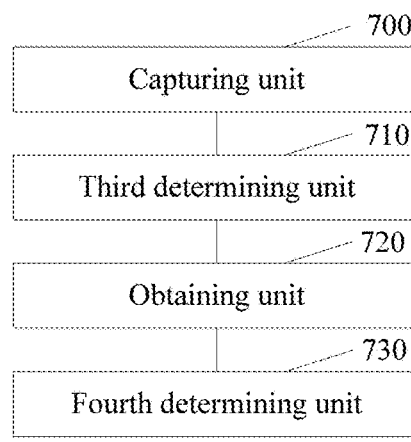
FIG. 7 is a schematic diagram of a functional structure of a mobile terminal according to an embodiment of the present disclosure.

Referring to FIG. 7, an embodiment of the present disclosure further provides a mobile terminal, including a capturing unit 700 configured to capture a luminance state presented by each visible light source included in a visible light source array at a position at which the mobile terminal is currently located, a third determining unit 710 configured to determine, according to the captured luminance state presented by each visible light source, a visible light source array pattern corresponding to the visible light source array, where the visible light source array pattern refers to coding information formed by identification information that is separately used to identify the luminance state corresponding to each visible light source included in the visible light source array, an obtaining unit 720 configured to obtain geographical position attribute information corresponding to the visible light source array pattern in a preset correspondence between geographical position attribute information of a position at which a visible light source array is located and a visible light source array pattern, and a fourth determining unit 730 configured to use the geographical position attribute information corresponding to the visible light source array pattern as current geographical position attribute information of the mobile terminal.

In this embodiment of the present disclosure, optionally, the geographical position attribute information acquired by the acquiring unit 720 includes physical position information and geographical direction information.

In this embodiment of the present disclosure, optionally, the fourth determining unit 730 is further configured to obtain, according to a locally stored correspondence between geographical position attribute information of a position at which a visible light source array is located and a visible light source array pattern, geographical position attribute information of a position that is corresponding to the determined visible light source array pattern and at which the visible light source array is located, and use the determined geographical position attribute information of the position at which the visible light source array is located as current geographical position attribute information of the mobile terminal.

In this embodiment of the present disclosure, optionally, the fourth determining unit 730 is further configured to send the visible light source array pattern determined by the third determining unit 710 to a map server, and receive geographical position attribute information of a position that is corresponding to the determined visible light source array pattern and at which the visible light source array is located, where the geographical position attribute information is determined and fed back by the map server according to the stored correspondence, and use the received geographical position attribute information of the position at which the visible light source array is located as current geographical position attribute information of the mobile terminal.

In this embodiment of the present disclosure, optionally, the fourth determining unit 730 is further configured to use physical position information of the position at which the visible light source array is located as current physical position information of the mobile terminal; and determine current geographical movement direction information of the mobile terminal according to an included angle between a direction pointing line corresponding to geographical direction information of the position at which the visible light source array is located and an axis specified when the mobile terminal captures the luminance state presented by each visible light source included in the visible light source array.

In conclusion, in this embodiment of the present disclosure, a mobile terminal can directly acquire a luminance state of each visible light source included in a visible light source array in order to determine current geographical position attribute information of the mobile terminal. The current geographical position attribute information of the mobile terminal is determined without using a signal forwarded by an optical receiver. Therefore, complexity of a positioning process is reduced.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device such that a series of operations and steps are performed on the computer or the another programmable device, thereby generating computer-implemented processing. Therefore, the instructions executed on the computer or another programmable device provide steps for implementing a function in one or more processes in the flowcharts and/or in one or more blocks in the block diagrams.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the embodiments of the present disclosure without departing from the spirit and scope of the embodiments of the present disclosure. In this way, the present disclosure is intended to cover these modifications and variations provided that they fall within the scope of protection defined by the following claims and their equivalent technologies.

What is claimed is:

1. A positioning method based on a visible light source, wherein the method is applied in a visible light source positioning system, wherein the system comprises a visible light source array and a visible light source controller, wherein the visible light source array comprises at least one visible light source, and wherein the method comprises:
    acquiring, by the visible light source controller, geographical position attribute information of a position at which the visible light source array is located, wherein the geographical position attribute information comprises physical position information and geographical direction information;
    determining, by the visible light source controller according to a preset correspondence between geographical position attribute information of the position at which the visible light source array is located and a visible light source array pattern, the visible light source array pattern corresponding to the acquired geographical position attribute information, wherein the visible light source array pattern refers to coding information formed by identification information that is separately used to identify a luminance state corresponding to each visible light source comprised in the visible light source array; and
    controlling, by the visible light source controller according to the determined visible light source array pattern, a luminance state of each visible light source comprised in the visible light source array.

2. The method according to claim 1, wherein before determining the visible light source array pattern corresponding to the acquired geographical position attribute information, the method further comprises acquiring, by the visible light source controller through a network, the preset correspondence between geographical position attribute information of the position at which the visible light source array is located and the visible light source array pattern, and wherein the correspondence is stored in a map server.

3. The method according to claim 1, wherein controlling, by the visible light source controller, the luminance state of each visible light source comprised in the visible light source array comprises controlling, by the visible light source controller, the luminance state of at least two neighboring visible light sources in the visible light source array to be the same.

4. The method according to claim 1, wherein when determining that at least one visible light source is added to the visible light source array, the method further comprises:
    updating, by the visible light source controller, the visible light source array pattern of the visible light source array; and
    sending, to a map server through a network, a correspondence between an updated visible light source array pattern and geographical position attribute information corresponding to the visible light source array pattern.

5. A positioning method based on a visible light source, comprising:
    capturing, by a mobile terminal, a luminance state presented by each visible light source comprised in a visible light source array at a position at which the mobile terminal is currently located;
    determining, by the mobile terminal according to the captured luminance state presented by each visible light source, a visible light source array pattern corresponding to the visible light source array, wherein the visible light source array pattern refers to coding information formed by identification information that is separately used to identify the luminance state corresponding to each visible light source comprised in the visible light source array;
    obtaining, by the mobile terminal, geographical position attribute information corresponding to the visible light source array pattern in a preset correspondence between geographical position attribute information of a position at which the visible light source array is located and the visible light source array pattern; and setting, by the mobile terminal, the geographical position attribute information corresponding to the visible light source array pattern as current geographical position attribute information of the mobile terminal.

6. The method according to claim 5, wherein obtaining, by the mobile terminal, the geographical position attribute information corresponding to the visible light source array pattern in the preset correspondence between the geographical position attribute information of the position at which the visible light source array is located and the visible light source array pattern comprises:
  obtaining, by the mobile terminal according to a locally stored correspondence between geographical position attribute information of the position at which the visible light source array is located and the visible light source array pattern, geographical position attribute information of the position that corresponds to the determined visible light source array pattern and at which the visible light source array is located; and
  setting, by the mobile terminal, the obtained geographical position attribute information of the position at which the visible light source array is located as the current geographical position attribute information of the mobile terminal.

7. The method according to claim 5, wherein obtaining, by the mobile terminal, the geographical position attribute information corresponding to the visible light source array pattern in the preset correspondence between the geographical position attribute information of the position at which the visible light source array is located and the visible light source array pattern comprises:
  sending, by the mobile terminal, the determined visible light source array pattern to a map server;
  receiving geographical position attribute information of the position that corresponds to the determined visible light source array pattern and at which the visible light source array is located, wherein the geographical position attribute information is received from the map server; and
  setting, by the mobile terminal, the received geographical position attribute information of the position at which the visible light source array is located as the current geographical position attribute information of the mobile terminal.

8. The method according to claim 6, wherein setting, by the mobile terminal, the geographical position attribute information of the position at which the visible light source array is located as the current geographical position attribute information of the mobile terminal comprises:
  setting, by the mobile terminal, physical position information of the position at which the visible light source array is located as current physical position information of the mobile terminal; and
  determining, by the mobile terminal, current geographical movement direction information of the mobile terminal according to an included angle between a direction pointing line corresponding to geographical direction information of the position at which the visible light source array is located and an axis specified when the mobile terminal captures the luminance state presented by each visible light source comprised in the visible light source array.

9. The method according to claim 7, wherein setting, by the mobile terminal, the geographical position attribute information of the position at which the visible light source array is located as the current geographical position attribute information of the mobile terminal comprises:
  setting, by the mobile terminal, physical position information of the position at which the visible light source array is located as current physical position information of the mobile terminal; and
  determining, by the mobile terminal, current geographical movement direction information of the mobile terminal according to an included angle between a direction pointing line corresponding to geographical direction information of the position at which the visible light source array is located and an axis specified when the mobile terminal captures the luminance state presented by each visible light source comprised in the visible light source array.

10. A device, comprising:
  a memory configured to store instructions; and
  a processor coupled to the memory and configured to execute the stored instructions, wherein the device is part of a visible light source positioning system, wherein the system comprises a visible light source array and the device, wherein the visible light source array comprises at least one visible light source, and wherein the processor is configured to:
    acquire geographical position attribute information of a position at which the visible light source array is located, wherein the geographical position attribute information comprises physical position information and geographical direction information;
    determine, according to a preset correspondence between geographical position attribute information of the position at which the visible light source array is located and a visible light source array pattern, the visible light source array pattern corresponding to the acquired geographical position attribute information, wherein the visible light source array pattern refers to coding information formed by identification information that is separately used to identify a luminance state corresponding to each visible light source comprised in the visible light source array; and
    control, according to the determined visible light source array pattern, a luminance state of each visible light source comprised in the visible light source array.

11. The device according to claim 10, wherein before determining the visible light source array pattern corresponding to the acquired geographical position attribute information, the processor is further configured to acquire, through a network, the preset correspondence between geographical position attribute information of the position at which the visible light source array is located and the visible light source array pattern, and wherein the correspondence is stored in a map server.

12. The device according to claim 10, wherein controlling the luminance state of each visible light source comprised in the visible light source array further comprises controlling the luminance state of at least two neighboring visible light sources in the visible light source array to be the same.

13. The device according to claim 10, wherein when determining that at least one visible light source is added to the visible light source array, the method further comprises:
  updating the visible light source array pattern of the visible light source array; and
  sending, to a map server through a network, a correspondence between an updated visible light source array pattern and geographical position attribute information corresponding to the visible light source array pattern such that the map server updates the existing correspondence between the visible light source array pattern and geographical position attribute information.

14. A device, comprising:
a memory configured to store instructions; and
a processor coupled to the memory and configured to:
  capture a luminance state presented by each visible light source comprised in a visible light source array at a position at which the device is currently located;
  determine, according to the captured luminance state presented by each visible light source, a visible light source array pattern corresponding to the visible light source array, wherein the visible light source array pattern refers to coding information formed by identification information that is separately used to identify the luminance state corresponding to each visible light source comprised in the visible light source array;
  obtain geographical position attribute information corresponding to the visible light source array pattern in a preset correspondence between geographical position attribute information of a position at which the visible light source array is located and the visible light source array pattern; and
  set the geographical position attribute information corresponding to the visible light source array pattern as current geographical position attribute information of the device.

15. The device according to claim 14, wherein obtaining the geographical position attribute information corresponding to the visible light source array pattern in the preset correspondence between the geographical position attribute information of the position at which the visible light source array is located and the visible light source array pattern further comprises:
  obtaining, according to a locally stored correspondence between geographical position attribute information of the position at which the visible light source array is located and the visible light source array pattern, geographical position attribute information of the position that is corresponding to the determined visible light source array pattern and at which the visible light source array is located; and
  setting the obtained geographical position attribute information of the position at which the visible light source array is located as the current geographical position attribute information of the device.

16. The device according to claim 14, wherein obtaining the geographical position attribute information corresponding to the visible light source array pattern in the preset correspondence between the geographical position attribute information of the position at which the visible light source array is located and the visible light source array pattern further comprises:
  sending the determined visible light source array pattern to a map server;
  receiving geographical position attribute information of the position that corresponds to the determined visible light source array pattern and at which the visible light source array is located, wherein the geographical position attribute information is determined and fed back by the map server according to the stored correspondence; and
  setting the received geographical position attribute information of the position at which the visible light source array is located as the current geographical position attribute information of the device.

17. The device according to claim 15, wherein setting the geographical position attribute information of the position at which the visible light source array is located as the current geographical position attribute information of the device further comprises:
  setting physical position information of the position at which the visible light source array is located as current physical position information of the device; and
  determining current geographical movement direction information of the device according to an included angle between a direction pointing line corresponding to geographical direction information of the position at which the visible light source array is located and an axis specified when the device captures the luminance state presented by each visible light source comprised in the visible light source array.

18. The device according to claim 16, wherein setting the geographical position attribute information of the position at which the visible light source array is located as the current geographical position attribute information of the device further comprises:
  setting physical position information of the position at which the visible light source array is located as current physical position information of the device; and
  determining current geographical movement direction information of the device according to an included angle between a direction pointing line corresponding to geographical direction information of the position at which the visible light source array is located and an axis specified when the device captures the luminance state presented by each visible light source comprised in the visible light source array.

* * * * *